May 7, 1963 T. GOLD 3,089,043
SOLAR POWER SOURCE FOR USE IN SPACE
Filed Dec. 23, 1958
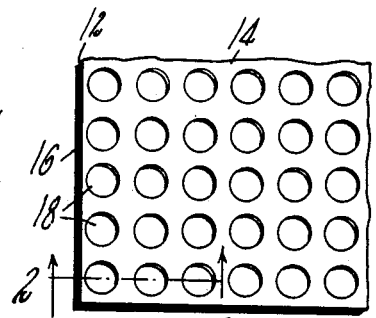
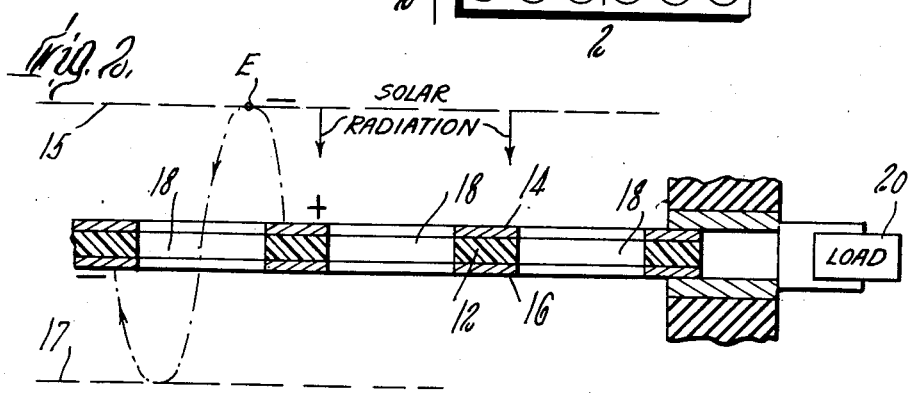
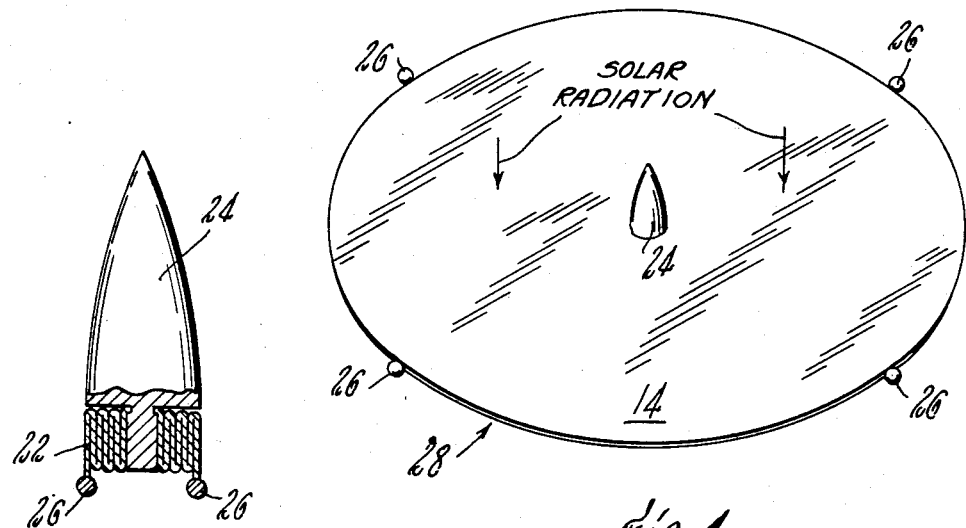

3,089,043
SOLAR POWER SOURCE FOR USE IN SPACE
Thomas Gold, Lincoln, Mass. (% Harvard College Observatory, 60 Garden St., Cambridge, Mass.)
Filed Dec. 23, 1958, Ser. No. 782,473
10 Claims. (Cl. 307—149)

This invention relates to electrical power sources and more particularly to solar power sources useful in space, that is, at altitudes of more than about 100 miles, say at an ambient atmospheric pressure less than about $1 \times 10^{-3}$ mm. of mercury.

The provision of suitable electrical power sources in space-borne vehicles has proved to be a difficult problem. This is particularly so in satellites carrying electrically powered instrumentation which it is desired to operate indefinitely. Conventional chemical batteries are, of course, useful for relatively short periods of time before they become exhausted if no means is provided to recharge them. Solar power sources have been suggested both for this purpose and as primary power sources. However, the solar power sources previously known, such as conventional semi-conductor solar cells, photocells and the like have relatively small output, not so much because of low conversion efficiency of solar radiation to electrical power, but rather because of the difficulty of providing a structure having sufficient area exposed to solar radiation to produce a substantial power input. As a practical matter, the exposed area of the vehicle itself is all that has been considered to be available in view of the difficulty of unfolding substantial areas of rigid supporting structures for solar cells. Much larger areas would be required to provide the substantial electrical power outputs required for instrumentation, radio signaling or radio relaying or electrical propulsion.

Accordingly, it is a main object of the present invention to provide a novel space-borne solar power source capable of producing substantial amounts of electrical power when exposed to solar radiation.

It is another object of the invention to provide a solar power source which may be carried within the body of a space vehicle during its passage through the earth's atmosphere and thereafter unfolded to provide a great area for exposure to solar radiation.

It is a feature of the invention that the power source provided, though of great area, is of extraordinarily simple construction and light weight such that it may readily be carried in folded configuration within the body of a space vehicle and thereafter unfolded by simple means.

For the purpose of explaining further objects and features of the invention, reference is made to the following detailed description of a preferred embodiment thereof, together with the accompanying drawings wherein:

FIG. 1 is an isomeric view of a portion of the solar power source of the invention;

FIG. 2 is an enlarged diagrammatic cross-sectional view of the power source of FIG. 1;

FIG. 3 is a diagrammatic view of the power source of FIGS. 1 and 2 in folded configuration within a space vehicle, and FIG. 4 is a diagrammatic view of the power source of FIG. 3 after unfolding for exposure to solar radiation.

In general, as may be seen in FIGS. 1 and 2, the solar power source of the invention comprises an apertured sheet of electrical insulating material having electrically conductive opposite surfaces insulated from one another, with at least one of said surfaces being capable of emitting electrons upon exposure to solar radiation. Thus, as shown in FIG. 2, a thin film or sheet of plastic insulating material 12 may be utilized, the opposite surfaces 14 and 16 of said sheet being metallized as with aluminum, and the sheet being provided with a plurality of through apertures 18. The plastic insulating material may be any of a number of thin, strong, preferably flexible, organic plastic films, say of thicknesses of the order of 0.10 to 10 mils. A flexible plastic film such as Mylar, a polyester sheet material, in about 1 mil thickness is entirely suitable although other films such as those of polyethylene, polystyrene, vinyl, etc. will serve as well, such plastics being preferably metallized with aluminum as by vacuum deposition or electroplating or otherwise on both surfaces thereof.

The apertures 18 may be circular and comprise approximately half of the sheet area. It is best for them to be of small size as hereinafter more fully explained. A range of dimensions from 1 inch to 1 mil may be used depending upon the photoemissive power of the material.

Although aluminum and other metals such as zinc, gold, etc. are effective as electron emitters in the strong solar ultraviolet light outside the atmosphere, it is advantageous to utilize more highly electron emissive materials as are known in the art. Cesium antimony $Cs_3Sb$, sodium antimony $Na_3Sb$, rubidium antimony $Rb_3Sb$, sodium potassium antimony $(NaK)_3Sb$, and the like are especially useful. These materials may be used as a coating on the metallized surfaces 14 and 16 or may be applied directly to the insulating sheet 12 to act as the electrically insulated conductive surfaces thereof. It may also be necessary to avoid poisoning by atmospheric gases, and therefore to apply the photoemissive surface material by vacuum evaporation after the ascent through the atmosphere.

In operation, if one surface 14 of such a sheet be exposed to solar radiation as shown by the arrows in FIG. 2, electrons E will be emitted from the exposed surface 14, thus leaving a residual positive charge thereon. These electrons will in effect form a negative space charge adjacent the surface 14, extending throughout a region whose thickness depends upon the efficiency of the emissive surface and the region of the solar spectrum utilized. In practice it may range from a few mils to a few feet. It is defined at its outer extent by dotted line 15 in FIG. 2. Within this region, electrons E emitted from surface 14 will be continuously rising from the surface and then falling back toward it because of the attraction of the residual positive charge thereon. Some of such electrons as shown at E in FIG. 2, however, will pass through the apertures 18 in the sheet and be attracted to return to the opposite, non-exposed conductive surface 16, and these electrons attracted from the back surface space charge zone defined by line 17 will produce a negative residual charge on such opposite surface. Because of these electrons E carrying a negative charge which so pass from the exposed surface 14 leaving a positive residual charge thereon, through apertures 18, and onto the opposite surface 16 to provide a negative charge thereon, these surfaces act as positive and negative current or, perhaps more conventionally stated, potential sources which can be connected to a load 20 such as instruments and other electrical load producing devices as in a space vehicle. Of course, not all of the electrons which pass through apertures 18 fall onto the non-exposed surface 16, they may well return again through holes 18. Nevertheless, a sufficiently large number of electrons will move from the exposed to the back surface as shown by the path of electron E of FIG. 1. None will make the reverse transfer. In accordance with the invention then, such movement will produce efficiencies of the order of those of present photoelectric devices, say about one percent. With the large exposed areas made possible by the structure of the invention, say of several hundred to several thousand square feet, substantial amounts of electrical power, say up to several kilowatts, will be produced. The size of the apertures 18 will largely be determined by the thickness of the space charge, i.e., within line 15 of FIG. 2. With the high efficiency emitters specifically set forth above, for example, such space charge is about 0.040 inch thick, so that for optimum efficiency the size and spacing of apertures 18 is about the same or less. In general, the aperture size and spacing is preferably somewhat less than the thickness of the space charge procured by the emitter.

The above described power source may be used with space vehicles such as satellites, for example, by placing it in a multifolded circular configuration 22 within a vehicle 24 projected through the earth's atmosphere to a suitable altitude, say at least about 100 miles or more. Upon reaching the desired altitude, the sheet may be spun out to unfold it by releasing from the vehicle as by ground radio control of suitable solenoids, weights attached to the outer circular edge of the sheet. The rotation of the vehicle will cause these weights to move outward by centrifugal force, opening the sheet to a circular planar configuration as at 28, with the electron emitting surface of said sheet in a position to be exposed to solar radiation. Other unfolding means, such as for example small compressed air jets actuated at a selected time to pull the sheet into a planar or other configuration exposing a large area may also be used. For example, an apertured hollow sphere may be used with an outer emissive surface and an inner surface at least conductive, the electrostatic charges on the sphere surfaces being effective to keep it in spherical configuration.

Thus, it will be seen that the invention provides a novel solar power source capable of practical application to space vehicles to provide substantial amounts of electrical power for indefinite operation of the instrumentation thereof. Various modifications within the spirit of the invention and the scope of of the appended claims will be apparent to those skilled in this art.

I claim:

1. A space-borne solar power source for use under conditions wherein the ambient atmospheric pressure is less than about $1 \times 10^{-3}$ mm. of mercury comprising an apertured sheet of electrical insulating material having electrically conductive opposite surfaces insulated from one another, at least one of said surfaces being capable of emitting electrons upon exposure to solar radiation, a portion of the electrons emitted by said surface exposed to solar radiation passing through the apertures of said sheet to the opposite surface thereof producing a positive residual charge on said exposed surface and a negative residual charge on said opposite surface, said surfaces being adapted to be connected to an electrical load as positive and negative potential sources therefor.

2. A power source as claimed in claim 1 wherein the apertures of said sheet comprise about 50 percent of the area thereof.

3. A power source as claimed in claim 1 wherein the size of the apertures of said sheet is in the range of about 1 inch to 1 mil.

4. A power source as claimed in claim 1 wherein the thickness of said sheet is about 0.10 to 10 thousandths of an inch.

5. A power source as claimed in claim 1 wherein said insulating sheet is of an organic plastic material and its opposite surfaces are metallized to provide separate electrically conductive surfaces capable of emitting electrons upon exposure to solar radiation.

6. A power source as claimed in claim 5 wherein said metallized surfaces further include a highly electron emissive material.

7. In a space vehicle having electrical load producing devices, a solar power source for use under conditions wherein the ambient atmospheric pressure is less than about $1 \times 10^{-3}$ mm. of mercury comprising a folded apertured sheet of electrical insulating material having electrically conductive opposite surfaces insulated from one another and connected to said electrical load producing devices, with at least one of said surfaces being capable of emitting electrons upon exposure to solar radiation, and means for unfolding said sheet into a configuration exposing a large area to solar radiation upon passage of said vehicle through the earth's atmosphere to an altitude of at least about 100 miles, a portion of the electrons emitted by said surface exposed to solar radiation passing through the apertures of said sheet to the opposite side thereof producing a positive residual charge on said exposed surface and a negative residual charge on said opposite surfaces as positive and negative potential sources for said devices.

8. A radiation responsive power source sheet material for use under conditions wherein the ambient pressure in contact therewith is less than about $1 \times 10^{-3}$ mm. of mercury comprising electrically conductive surfaces insulated from one another with apertures therebetween, at least one of said surfaces being capable of emitting electrons upon exposure to radiation, a portion of the electrons emitted by said surface exposed to said radiation passing through said apertures from said exposed surface to another surface thereof producing a positive residual charge on said exposed surface and a negative residual charge on said other surface, said surfaces being adapted to be connected to an electrical load as positive and negative potential sources therefor.

9. A power source for use under conditions wherein the ambient pressure is less than about $1 \times 10^{-3}$ mm. of mercury comprising composite sheet material, said sheet material having a top conducting layer provided with a surface capable of emitting electrons upon exposure to solar radiation, a bottom conducting layer and an insulating layer separating said two conducting layers, the top layer and the insulating layer being interrupted to provide openings which permit passage of electrons emitted from the top surface to the bottom layer, the electrons which pass through the openings producing a positive residual charge on the surface of the top conducting layer exposed to radiation and a negative residual charge on the bottom conducting layer, and means for connecting said two conducting layers to an electrical load as positive and negative potential sources therefor.

10. A radiation responsive power source sheet material for use under conditions wherein the ambient pressure in contact therewith is less than about $1 \times 10^{-3}$ mm. of mercury comprising electrically conductive surfaces insulated from one another by an apertured sheet of insulating material therebetween, at least one of said surfaces being capable of emitting electrons upon exposure to radiation, a portion of the electrons emitted by said surface exposed to said radiation passing through said apertures from said exposed surface to another surface thereof producing a positive residual charge on said exposed surface and a negative residual charge on said other surface, said surfaces being adapted to be connected to an electrical load as positive and negative potential sources therefor.

References Cited in the file of this patent

UNITED STATES PATENTS 2,805,360 McNaney _____ Sept. 3, 1957